Figure 1:
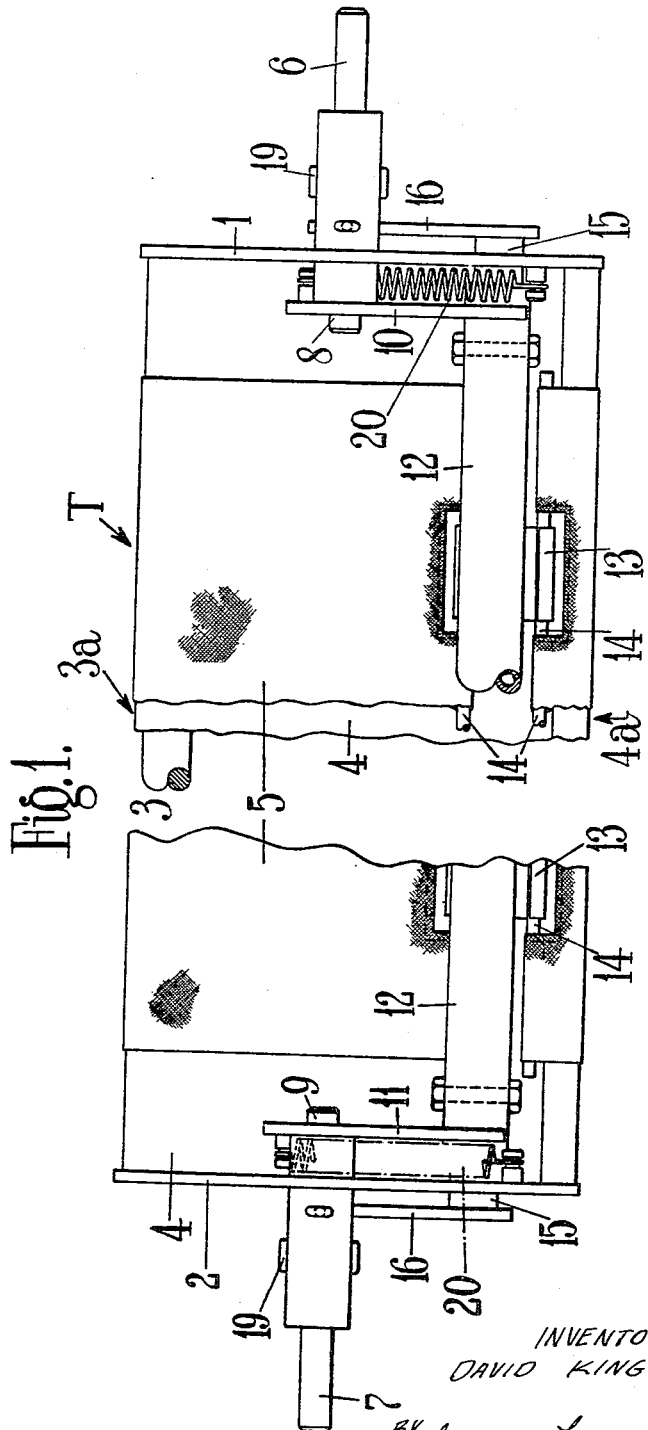

Sept. 18, 1962

D. K. BAKER 3,054,498

SWING TRAY CONVEYORS FOR BAKERY PLANT

Filed Dec. 2, 1959

5 Sheets-Sheet 1

INVENTOR
DAVID KING BAKER

BY Fearman, Fearman, & McCulloch
ATTORNEYS

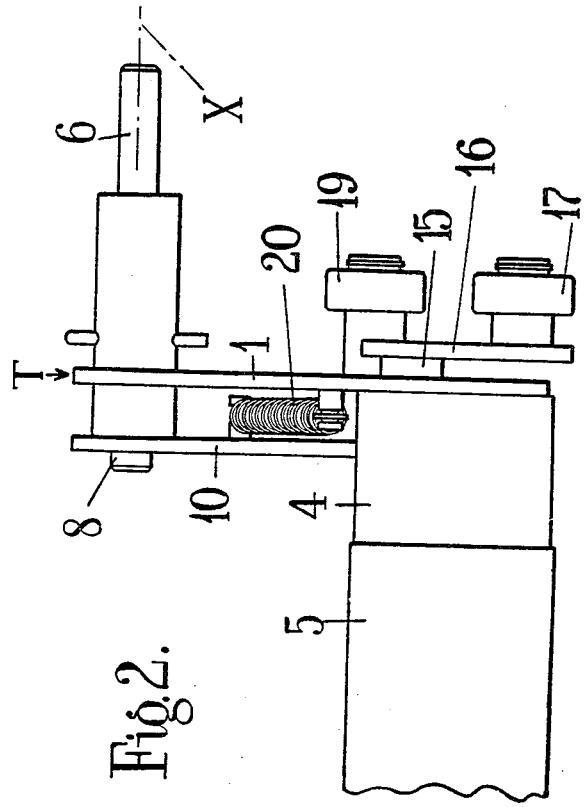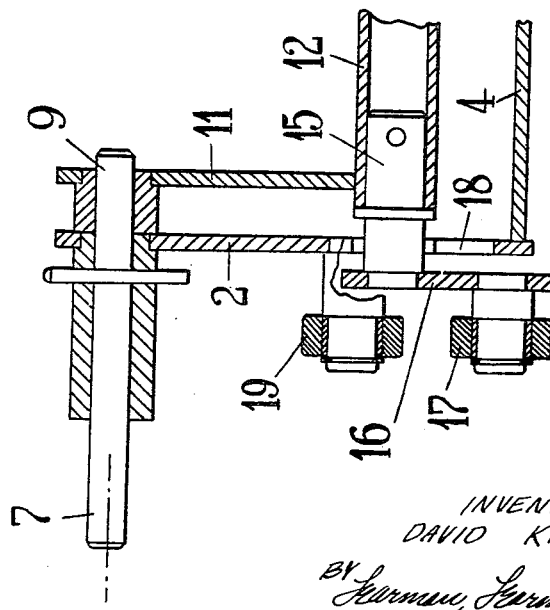

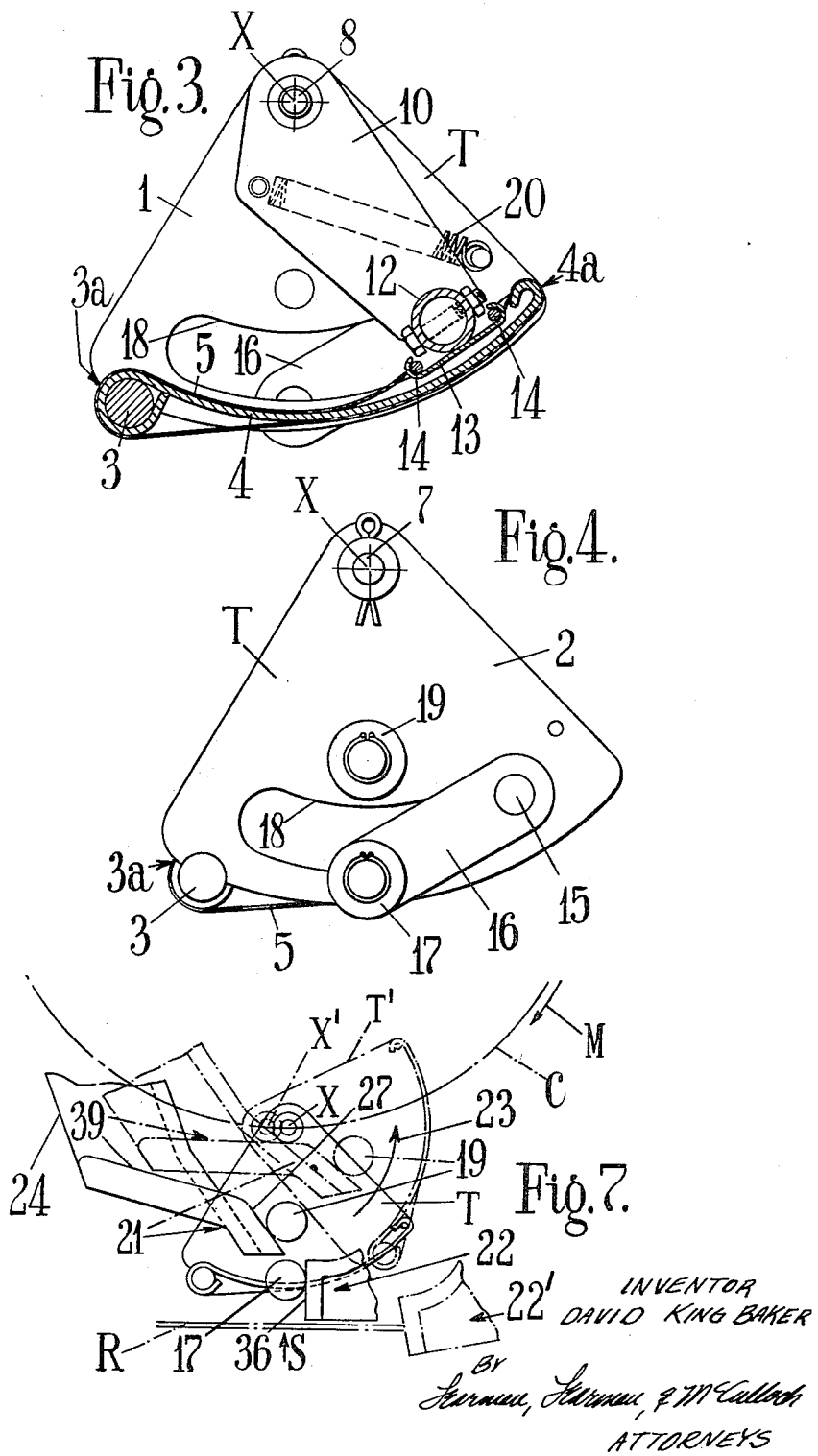

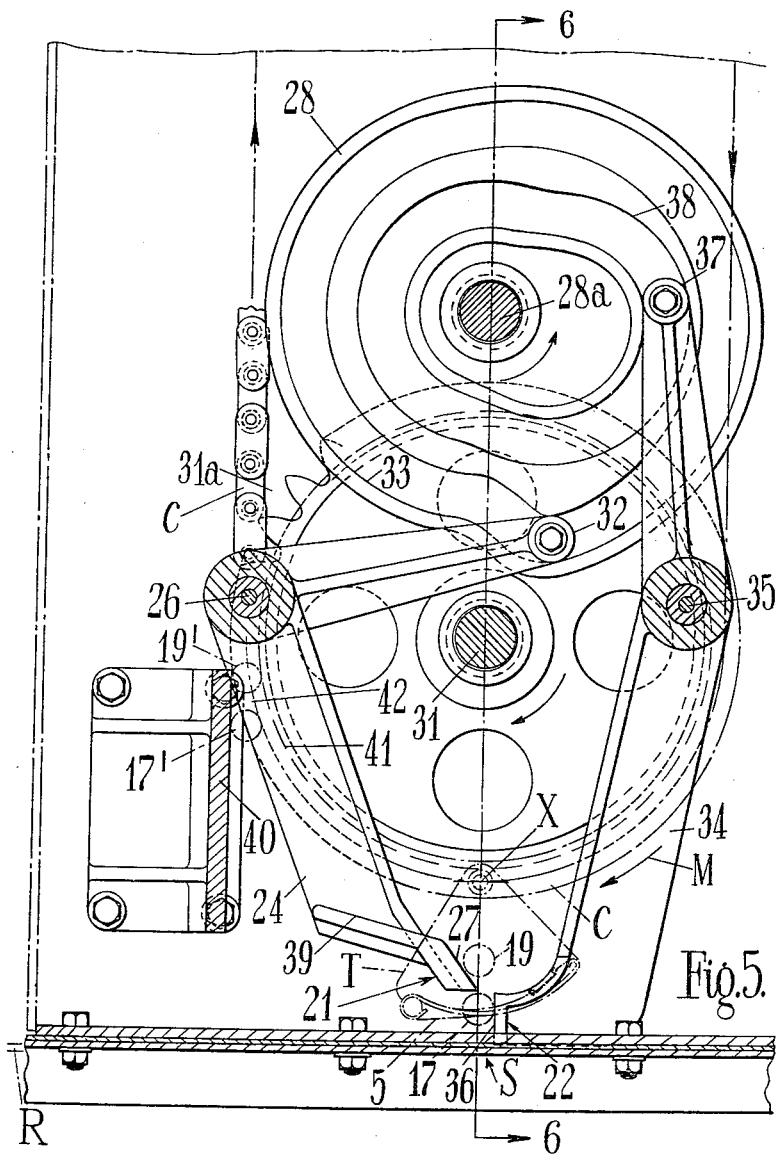

United States Patent Office 3,054,498
Patented Sept. 18, 1962

3,054,498
SWING TRAY CONVEYORS FOR BAKERY PLANT
David King Baker, Peterborough, England, assignor to Baker Perkins Incorporated, Saginaw, Mich.
Filed Dec. 2, 1959, Ser. No. 856,740
Claims priority, application Great Britain, Dec. 5, 1958
12 Claims. (Cl. 198—155)

This invention relates to swing tray conveyor constructions and ancillary mechanism for the conveyors of bakery provers of the type in which each tray has a fixed structure or framework and a goods-supporting surface comprising a flexible band or apron which is displaceable conveyor-wise on the framework for tray unloading purposes so that the goods thereon are gently transferred in known manner to a closely adjacent receiving surface such as the band of an oven. Apparatus of this type is of particular utility for handling un-contained or unsupported dough-pieces, e.g. dough pieces for the production of bread rolls as compared with dough or dough pieces in tins for the production of pies or bread, since it is desirable that the dough pieces are maintained right way up during and after transfer and are not subjected to rolling or undue rough handling.

It is an object of the present invention to provide an improved construction of swing tray and ancillary mechanism of the type indicated such that the trays of the conveyor can each be unloaded at an unloading station while the conveyor continues its conveying movement.

According to the present invention, in or for swing tray conveyors having swing trays of the type indicated, movable abutment means are provided at an unloading station for engaging each tray structure at a contact point spaced from its point of suspension on the conveyor to displace that contact point on the tray structure temporarily in a direction opposite to that of the tray travel while the point of suspension of the tray continues to move along the conveyor path whereby the tray tilts, and further abutment means are provided which engage complementary means operatively secured to the flexible band or apron on the tray framework but displaceable with respect to the framework and hold the complementary means stationary while the tray tilts and to anchor the point of securement of the band or apron against movement with the tray such that a relative movement takes place between the tray frame and the flexible band or apron which is displaced conveyor-wise over the framework to transfer the goods gently from the band or apron to an adjacent receiving surface.

In one form of the apparatus, according to the present invention, the band or apron passes round front and rear turning point members on the tray and is connected at least at or towards each end of the tray to the free end of swing arm means pivoted to the tray end structure at or adjacent its suspension point from the conveyor, such that swinging of the arms cause the band or apron to slip round the tray framework and be displaced conveyor-wise relative thereto. The swing arms or means associated therewith have secured thereto the complementary means which are to be held stationary at the unloading station during tilting of the tray, the complementary means preferably extending through slots in the tray end structures and terminating forwardly of the normal position of the free ends of the pivotal arms and at a point substantially vertically below the suspension point of the tray when the latter is hanging freely.

It is further preferred that an anchorage member for the ends (or for the single point of attachment) of the band or apron extends wholly across the tray between the free ends of the swing arms at each end of the tray to provide proper securement of the band or apron across its entire width.

Figure 6:
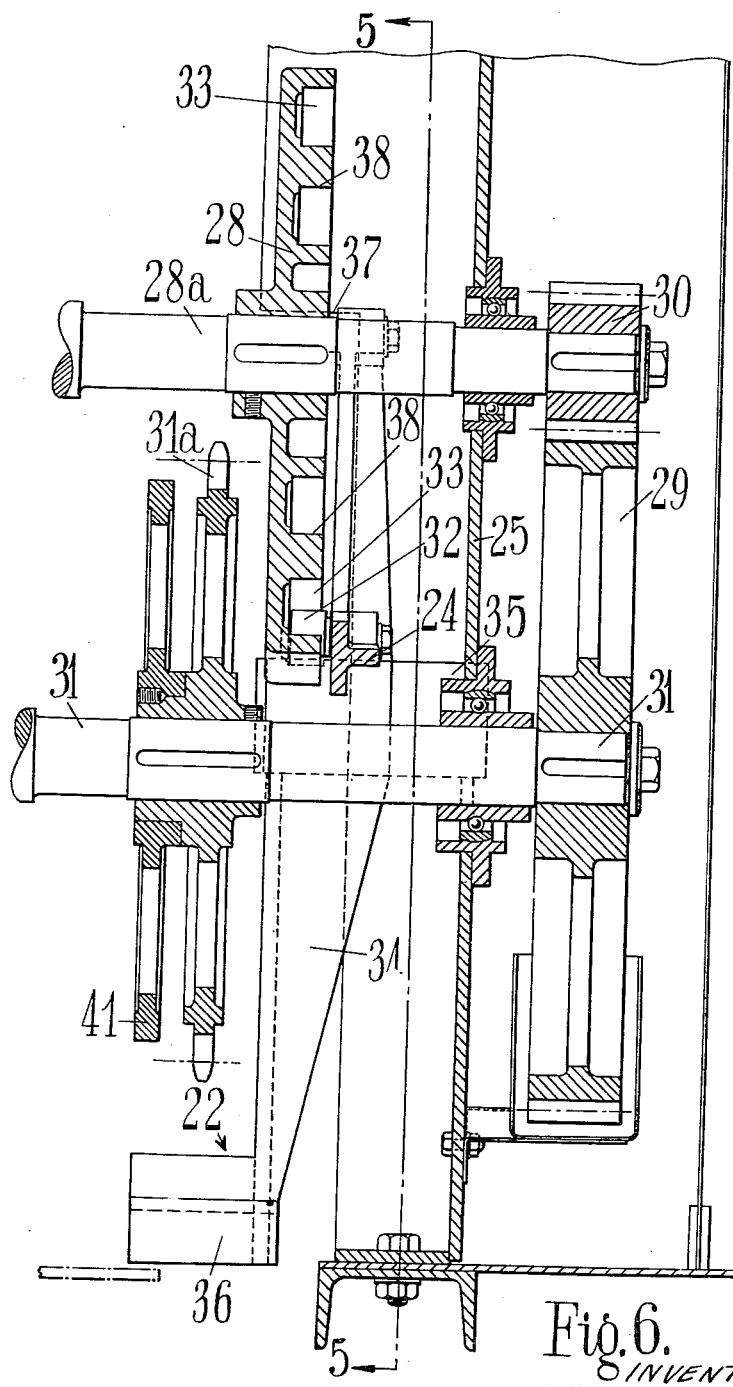

In the accompanying drawings:
FIGURE 1 is a plan view of a bakery oven swing tray according to the present invention,
FIGURE 2 is a rear elevation of the tray shown in FIGURE 1, partly in section,
FIGURE 3 is a transverse section of the tray shown in FIGURE 1,
FIGURE 4 is an end elevation thereof,
FIGURE 5 is a side elevation of the bakery conveyor means carrying trays as shown in FIGURES 1 to 4 and unloading means therefor, viewed on the line 5—5 of FIGURE 6,
FIGURE 6 is a cross section of the unloading mechanism shown in FIGURE 5, and
FIGURE 7 is a diagrammatic view of the unloading movements of a swing tray at the unloading station under the influence of the mechanisms shown in FIGURES 5 and 6.

In carrying the invention into effect, according to one mode by way of example, each swing tray T for the conveyor, see FIGURES 1 to 4, comprises a frame composed of spaced end plates 1 and 2 interconnected by a frame bar 3. A bottom plate 4 and a goods-supporting conveyor surface in the form of a flexible band or apron 5 lies on top of the bottom plate 4 to form a bottom for the tray and passes round the front and rear edges 3a and 4a of the bottom plate 4 (see FIGURE 3) the latter serving as turning point members for the band or apron 5 as will be described.

The end plates 1 and 2 are provided at main apices with suspension pivots 6 and 7 by which the trays are pivotally secured on an axis X to the conveyor chain (not shown in FIGURES 1 to 4) in known manner. The pivots 6 and 7 have inward extensions 8 and 9 on which are carried operating or swing arms 10 and 11 interconnected at their lower (swinging) ends by a swing bar 12. The swing bar 12 has secured thereto, e.g. welded, two or more hooked members 13 which engage rods 14 secured along the transverse edges of the band or apron 5 so that the band or apron 5 is connected at each transverse end to the swing bar 12. By this arrangement, when the swing arms 10 and 11 and the swing bar 12 are swung as a unit, as will be described, the band or apron 5 slips round the bottom plate 4 of the tray framework and moves conveyor-wise relative to the tray framework for the purpose of unloading goods gently from the trays to a closely adjacent receiving surface as will be described.

The swing arms 10 and 11 are conveniently located on the inside of the tray end plates 1 and 2, but have associated with them means external to, or outward of, the end plates for causing the swing arms 10 and 11 and swing bar 12 to be moved at the appropriate time and place to unload the tray. To this end, the swing bar 12 has at each end extension posts 15 fixed therein and secured to the end of each post 15 is an actuating link 16 carrying at its outer end a contact roller 17, the posts 15 extending through arcuate slots 18 in the end plates 1 and 2. The length and disposition of each link 16 is such that its roller 17 is normally located centrally below the adjacent suspension pivot 6 or 7.

The tray structure is further provided on each end plate 1 and 2 with a second contact roller or stop 19 also normally directly below the adjacent pivot 6 or 7 and secured directly on to the associated end plate. The object of the second roller 19 is to provide abutment means by which the trays T can be caused to pivot about the suspension pivots 6 and 7 at the appropriate time and place to facilitate unloading of the trays.

In order to maintain the swing arms 10 and 11, the swing bar 12 and the band or apron 5 in their normal position (as shown in FIGURES 1 and 3), a tension spring 20 is provided between each swing arm 10 and 11 and their associated end plates 1 and 2.

For the purpose of operating the unloading mechanism, i.e. moving the band or apron 5, of each tray T as it takes up position in the unloading station (indicated at S in FIGURE 5) of the conveyor C and for the purpose of tilting the tray, two movable abutment means 21 and 22 are located in or adjacent the unloading station, the abutment means 21 (hereinafter referred to as the tilting abutment means 21) for engaging the second rollers 19 on each tray and displacing the tray back in a direction opposite to the movement M of the conveyor C thereby tilting the tray, and the other, actuating abutment means 22 (hereinafter referred to as the apron abutment means 22) for engaging and holding stationary the roller 17, link 16 and swing arms 10 and 11 associated with the band or apron 5 so that, as the tray tilts, the point of securement of the band or apron 5 to the swing bar 12 is anchored against movement with the tray whereby the band or apron 5 slides conveyor-wise over the tray bottom plate 4 to transfer by a peeling action the goods on the tray onto the closely adjacent receiving surface indicated at R on FIGURE 7. The tilting abutment means 21 are movable in timed relation to the arrival of a tray T at the unloading stations, such that after the tray makes contact therewith the tray T is swung rearwardly (i.e. in the direction of the arrow 23 in FIGURE 7) with respect to the conveyor C by a composition of the continuing forward movement of the conveyor (and the point X of suspension of the tray) and the rearward displacement of the lower part of the tray in a direction opposite to such conveyor movement.

This tilting abutment means 21 is conveniently in the form of a swingable bell-crank lever 24 pivoted to the machine structure 25 at 26 and having an abutment surface 27 at its lower end. The lever 24 is operated by rotary cam means 28 on a driven shaft 28a and carries a cam-following roller 32 working in a box cam groove 33 in the rotary cam means 28. The rotary cam shaft 28a also drives, via gears 29 and 30, a shaft 31 carrying sprocket or like wheel means, indicated at 31a in FIGURES 5 and 6, around which the conveyor C passes.

The apron abutment means 22 is also displaceable, but only to move in and out of the path of the trays T as they enter the unloading station (see FIGURE 7), the apron abutment means 22 being out of the way of the rollers 17 on the tray until the moment the tray engages the tilting abutment means 21 when it is brought into position against the rollers 17 to hold the band or apron 5 during tilting of the tray (as described above) and being moved out of the way (to the position 22', FIGURE 7) prior to the arrival of the next tray. The apron abutment means 22 comprises a lever 34 pivotally mounted at 35 on the machine structure 25 and having an abutment surface 36 at its lower end. The apron abutment means 22 is also motivated by the rotary cam means 28 by the engagement of a cam-following roller 37 working in a box cam groove 38 in the rotary cam means 28.

The abutment face 27 of the tilting abutment means 21 is preferably ramp-shaped (i.e. inclined) so that on arrival of a tray T at the unloading stations and during movement of the track back to its final position T' of tilt the abutment face 27 holds and controls the tray, but so that on completion of tilt and when unloading of the tray is complete, the rollers 19 on the tray ride over the ramp of the abutment face 27 of each abutment means 21 and the tray continues bodily on its way but still tilted so as to avoid fouling the goods just unloaded by engagement of the rollers 19 with an extension surface 39 leading from the abutment face 27 of each abutment means 21. When the tray is clear of the unloading stations, the extension surface 39 on each abutment means 21 runs out and the tray swings down to resume its normal hanging position. It will be seen that while the tray is tilted due to the engagement between the surface 27 of the tilting abutment means 21 and the rollers 19 on the tray (and also due to the movement of the axis of support of the tray on the conveyor C from X to X'), the rollers 17 associated with the swing arms 10 and 11 are held stationary by the surface 36 of the apron abutment means 22 so that relative movement occurs between the tray structure (i.e. the end plates 1 and 2 and the bottom plate 4) and the band or apron 5 which is anchored along with the swing arms 10 and 11 and swing bar 12. Thus, the band or apron 5 moves conveyor-wise over the bottom plate 4 of the tray and causes any articles on the tray to be deposited gently on to the receiving surface R, assisted by the concomitant tilting of the tray.

In order to steady the tray after tilting and in order to return the band or apron 5 and its actuating means (i.e. the swing arms 10 and 11 and the swing bar 12), on the tray to their normal position after unloading, fixed abutment means 40 are disposed beyond the unloading stations to engage the rollers 17 associated with the said actuating means and the rollers 19 are brought into contact with the periphery of a disc 41 mounted on the shaft 31 adjacent the sprocket or like wheel 31a. Thus the rollers 17 and 19 are passed, in effect, through a throat 42 (between the surface of the fixed abutment means 40 and the periphery of the disc 41) which causes a relative movement between the rollers 17 and 19 to cause them to assume their normal position one below the other below the tray suspension point on the conveyor (see roller positions 17' and 19' in the throat 42, FIGURE 5). This causes the return of the band or apron 5, as each tray is carried forward by the conveyor C, the band or apron actuating means being spring-loaded (as described above) to retain them in their returned position thereafter.

I claim:

1. A swing tray construction comprising a tray frame structure including a pair of spaced apart side members; pivotal means on said frame for swingably mounting said tray; conveyor means; means movably mounting said conveyor means on said frame between said side members whereby said conveyor means forms a movable bottom for said tray; operating arm means; means rockably mounting said arm means on said frame for movement relative thereto; and means connecting said arm means to said conveyor means whereby relative movement of said arm means and said frame causes movement of said conveyor means relative to said frame.

2. The construction set forth in claim 1 including yieldable means reacting between said frame and said arm means and biasing the latter to one position relative to said frame.

3. The construction set forth in claim 1 including an actuating device on said arm means for imparting rocking movements thereto.

4. The construction set forth in claim 3 wherein at least one of said side members has an opening therein through which said actuating device extends.

5. A swing tray conveyor construction comprising a movable tray frame structure; tray conveying means; pivotal means swingably mounting said frame on said conveying means for movement therewith; abutment means; means mounting said abutment means in the path of movement of said tray to provide an unloading station; conveyor means movably mounted on said tray frame and forming a bottom for said tray; operating means connected to said conveyor means for moving the latter relatively to said frame; stop means on said frame engageable with said abutment means for swinging said tray frame relatively to said conveying means adjacent said unloading station; and actuating means adjacent said unloading station engageable with said operating means and operable in response to said swinging movement of said tray frame for effecting operation of said operating means.

6. The construction set forth in claim 5 wherein said operating means comprises arm means rockably mounted on said frame and connected to said conveyor means.

7. The construction set forth in claim 6 wherein said actuating means comprises a stop device on said arm means and second abutment means engageable with said stop device upon swinging movement of said tray frame.

8. The construction set forth in claim 7 wherein said second abutment means is movable and including means connected to said second abutment means for moving the latter in timed relation to the delivery of said tray frame to said unloading station by said conveying means.

9. The construction set forth in claim 5 wherein said abutment means is movable and including means connected thereto for moving said abutment means.

10. A swing tray conveyor construction comprising a tray frame structure; conveying means movable in a path; means mounting said frame on said conveying means for movement therewith and for tilting movements relative thereto; conveyor means movably mounted on said frame and forming a goods supporting surface therefor extending generally in the direction of the path of travel of said conveying means; operating means connected to said conveyor means for moving the latter; abutment means mounted in the path of movement of said frame to provide an unloading station, said abutment means being engageable with said frame for tilting the latter in a direction generally opposite the direction of travel of said conveying means; and actuating means mounted adjacent said unloading station and engageable with said operating means in response to tilting of said frame for moving said conveyor means in a direction generally the same as the direction of travel of said conveying means.

11. The construction set forth in claim 10 wherein said abutment means is movable in timed relation to the movement of said frame to and beyond said unloading station, and including means connected to said abutment means for moving the latter.

12. The construction set forth in claim 10 wherein said actuating means includes second abutment means, and means connected to said second abutment means for moving the latter in timed relation to the tilting of said frame.

References Cited in the file of this patent

UNITED STATES PATENTS

| 1,165,035 | Streit | Dec. 21, 1915 |
| 1,382,610 | Streich | June 21, 1921 |

FOREIGN PATENTS

| 1,434,601 | France | Nov. 7, 1922 |